(12) United States Patent
Huh

(10) Patent No.: US 9,891,819 B2
(45) Date of Patent: *Feb. 13, 2018

(54) APPARATUS AND METHOD FOR INPUTTING CHARACTER USING TOUCH SCREEN IN PORTABLE TERMINAL

(71) Applicant: Samsung Electronics Co., Ltd., Suwon-si, Gyeonggi-do (KR)

(72) Inventor: Jung-Chul Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,504

(22) Filed: Dec. 16, 2013

(65) Prior Publication Data

US 2014/0104215 A1    Apr. 17, 2014

Related U.S. Application Data

(63) Continuation of application No. 11/759,714, filed on Jun. 7, 2007, now Pat. No. 8,610,669, which is a (Continued)

(30) Foreign Application Priority Data

Oct. 29, 2003    (KR) .................. 10-2003-0075739

(51) Int. Cl.
*G06F 3/02* (2006.01)
*G06F 3/041* (2006.01)
(Continued)

(52) U.S. Cl.
CPC ............ *G06F 3/04886* (2013.01); *G06F 3/02* (2013.01); *G06F 3/0233* (2013.01); (Continued)

(58) Field of Classification Search
CPC .... G09G 5/00; G09G 5/08; G06F 3/02; G06F 3/041; G06F 3/045; G06F 3/033
(Continued)

(56) References Cited

U.S. PATENT DOCUMENTS

| | | |
|---|---|---|
| 5,434,929 A | 7/1995 | Beernink et al. |
| 5,736,974 A | 4/1998 | Selker |

(Continued)

FOREIGN PATENT DOCUMENTS

| | | |
|---|---|---|
| CN | 1224189 A | 7/1999 |
| DE | 103 10 794 A1 | 9/2004 |

(Continued)

*Primary Examiner* — Pegeman Karimi
(74) *Attorney, Agent, or Firm* — Jefferson IP Law, LLP

(57) ABSTRACT

A method of inputting characters in a portable terminal is provided. The method includes displaying a plurality of characters on a keyboard, detecting a touch on the keyboard, displaying one character corresponding to a key corresponding to the touch on the keyboard as enlarged relative to other characters upon detecting the touch, displaying the character, which is displayed enlarged when detecting a release of the touch, in a character input area upon detecting a release of the touch on the keyboard, and displaying a plurality of recommended words in a vicinity of the keyboard based on characters which have been inputted so far, at least one of the plurality of recommended words comprising the characters which have been inputted so far.

10 Claims, 10 Drawing Sheets

Related U.S. Application Data continuation-in-part of application No. 10/951,250, filed on Sep. 27, 2004, now Pat. No. 7,969,421.

(51) Int. Cl.
  *G06F 3/0488* (2013.01)
  *H04M 1/02* (2006.01)
  *G06F 3/0489* (2013.01)
  *G06F 3/023* (2006.01)
  *G06F 3/0484* (2013.01)
  *G09G 5/26* (2006.01)

(52) U.S. Cl.
  CPC .......... *G06F 3/0412* (2013.01); *G06F 3/0416* (2013.01); *G06F 3/0418* (2013.01); *G06F 3/04845* (2013.01); *G06F 3/04895* (2013.01); *G09G 5/26* (2013.01); *H04M 1/0266* (2013.01); *G06F 2203/04805* (2013.01)

(58) Field of Classification Search
  USPC .................. 345/156, 157, 173, 174, 175
  See application file for complete search history.

(56) References Cited

U.S. PATENT DOCUMENTS

| | | | |
|---|---|---|---|
| 5,956,021 A | 9/1999 | Kubota et al. | |
| 6,073,036 A * | 6/2000 | Heikkinen et al. | 455/550.1 |
| 6,169,538 B1 | 1/2001 | Nowlan et al. | |
| 6,269,260 B1 | 7/2001 | Shin et al. | |
| 6,292,179 B1 | 9/2001 | Lee | |
| 6,573,844 B1 * | 6/2003 | Venolia et al. | 341/22 |
| 6,724,370 B2 | 4/2004 | Dutta et al. | |
| 6,801,190 B1 * | 10/2004 | Robinson | G06F 3/0219 345/173 |
| 6,803,905 B1 | 10/2004 | Capps et al. | |
| 6,894,679 B2 | 5/2005 | Suzuki | |
| 7,009,600 B2 | 3/2006 | Jones et al. | |
| 7,075,512 B1 | 7/2006 | Fabre et al. | |
| 7,098,896 B2 * | 8/2006 | Kushler et al. | 345/168 |
| 7,372,454 B2 * | 5/2008 | Betts-LaCroix | 345/168 |
| 7,969,421 B2 | 6/2011 | Huh | |
| 2004/0004738 A1 | 1/2004 | Ikeda | |
| 2004/0135818 A1 * | 7/2004 | Thomson et al. | 345/823 |
| 2004/0160419 A1 | 8/2004 | Padgitt | |
| 2004/0165009 A1 | 8/2004 | Blakely et al. | |
| 2006/0161846 A1 | 7/2006 | Van Leeuwen | |
| 2006/0181519 A1 | 8/2006 | Vernier et al. | |
| 2007/0040813 A1 | 2/2007 | Kushler et al. | |

FOREIGN PATENT DOCUMENTS

| | | |
|---|---|---|
| JP | 06-186938 A | 7/1994 |
| JP | 9-81320 A | 3/1997 |
| JP | 10-269022 A | 10/1998 |
| JP | 2002-62966 A | 2/2002 |
| JP | 2002-91676 A | 3/2002 |
| JP | 2002-91677 A | 3/2002 |
| JP | 2003-177848 A | 6/2003 |
| JP | 2004-38407 A | 2/2004 |
| JP | 2005-44026 A | 2/2005 |
| JP | 2005-182487 A | 7/2005 |
| JP | 2005-266850 A | 9/2005 |
| JP | 2006-59238 A | 3/2006 |
| KR | 10-0309108 B1 | 9/2001 |
| WO | 06-186938 A1 | 7/1994 |
| WO | 94/29788 A1 | 12/1994 |

\* cited by examiner

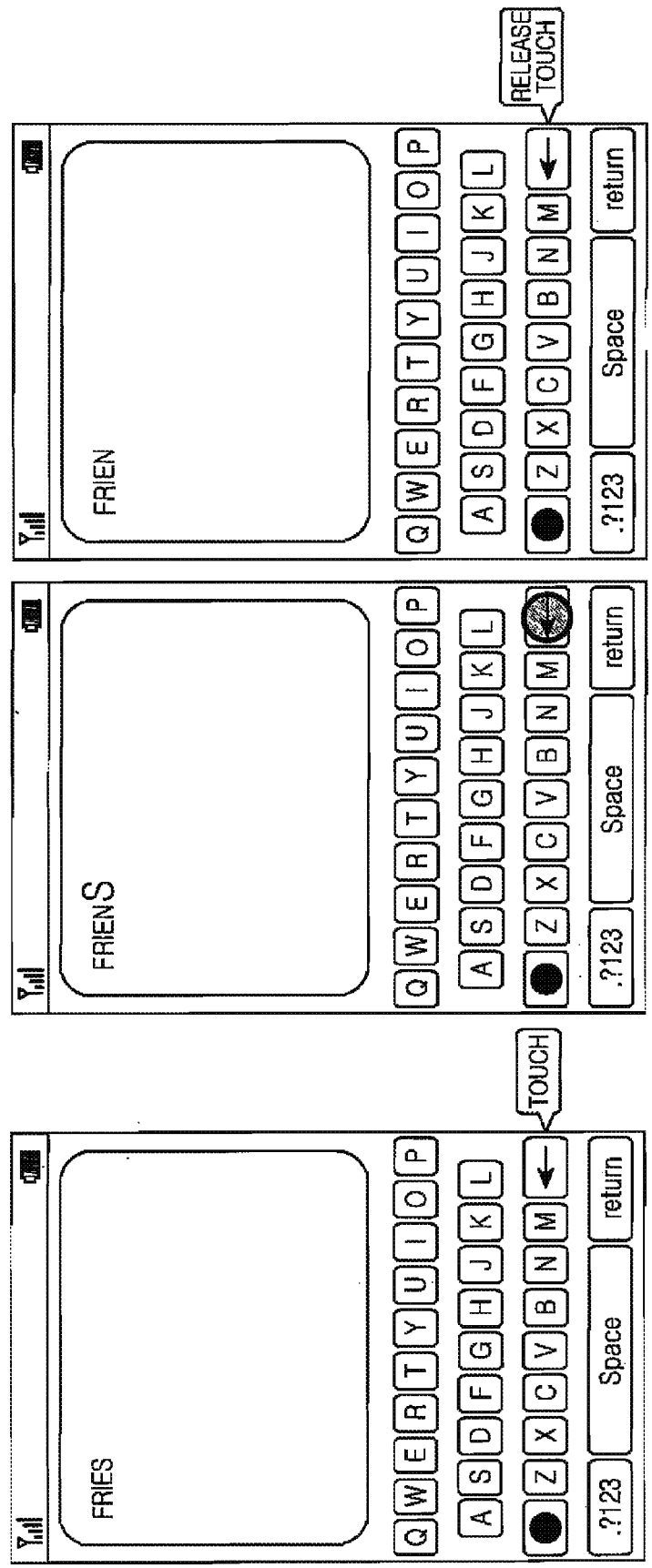

APPARATUS AND METHOD FOR INPUTTING CHARACTER USING TOUCH SCREEN IN PORTABLE TERMINAL

RELATED APPLICATION(S)

This application is a continuation application of a prior application Ser. No. 11/759,714, filed on Jun. 7, 2007, which is a continuation in part under 35 U.S.C. § 120 of a prior application Ser. No. 10/951,250, filed on Sep. 27, 2004 and issued under U.S. Pat. No. 7,969,421, which claimed the benefit of a Korean patent application filed on Oct. 29, 2003 in the Korean Intellectual Property Office and assigned Ser. No. 10-2003-0075739, the entire disclosure of which is hereby incorporated by reference.

BACKGROUND OF THE INVENTION

1. Field of the Invention

The present invention relates generally to an apparatus and method for inputting characters using a touch screen in a portable terminal, and in particular, to an apparatus and method for inputting characters without errors.

2. Description of the Related Art

A portable terminal may be equipped with a touch screen and its major example is a PDA (Personal Digital Assistant).

In general, the major components of the PDA are a computer, that is, a CPU (Central Processing Unit), a memory, and an OS (Operating System), and a variety of software programs and peripheral devices based on the OS. The PDA functions to gather, store, form, and search information. Recently, the PDA has been developed as a multi-functional device equipped with a portable phone module to enable voice calls and data communications (e.g., Web browsing).

One popular example of a PDA is the Palm Pilot produced by the Pam Computing Company, and other similar personal, portable digital devices are called PDA. Among products operating on Windows CE of Microsoft, a device using a pen without a keyboard is called PPC (Palm-Sizes PC) and a device using a keyboard is called HPC (Handheld PC). The term "PDA" includes all these devices.

The PDA is usually provided with a touch screen. A user inputs a character using a soft keyboard displayed on the touch screen. The user invokes an application program by touching an icon displayed on the touch screen with his/her finger or a stylus pen. Characters may be input by touching the soft keyboard displayed in a predetermined screen area.

A pocket-size device such as the PDA, however, experiences frequent character editing due to errors caused by the limited screen size. That is, the PDA has the shortcomings of inconvenience and unnecessary time consumption involved in frequent editing.

SUMMARY OF THE INVENTION

The present invention provides an apparatus and method for inputting characters without errors using a touch screen in a portable terminal.

The present invention also provides an apparatus and method in which an input character is displayed enlarged and the character is input to a main screen area upon detecting the release of touch when characters are input using a touch screen in a portable terminal.

The present invention also provides an apparatus and method in which one or more recommended words formed by combining input characters which have been input so far, and one of the recommended words is selected and displayed in a main screen area of a portable terminal equipped with a touch screen.

The present invention also provides an apparatus and method in which a touched character is displayed enlarged, and the character is input to a main screen area upon detecting a next touch in a portable terminal equipped with a touch screen.

The present invention also provides an apparatus and method in which a next input character is predicted and displayed enlarged in a portable terminal equipped with a touch screen.

The present invention also provides an apparatus and method in which characters forming a word are sequentially touched by dragging, and the word is input to a main screen area upon detecting the release of touch in a portable terminal.

According to one aspect of the present invention, there is provided a method of inputting characters in a portable terminal, comprising the steps of: displaying a soft keyboard in a character input mode; recognizing a character touched on the soft keyboard; displaying the recognized character enlarged and displaying one or more recommended words formed by combining characters which have been touched so far in a predetermined screen area; and inputting the character displayed enlarged to a main screen area upon detecting the release of touch.

According to another aspect of the present invention, there is provided a method of inputting characters in a portable terminal, comprising the steps of: displaying a soft keyboard in a character input mode; inputting a character, which has been touched on the soft keyboard, to a main screen area; predicting a next input character on the basis of characters which have been touched so far; and displaying the predicted character.

According to another aspect of the present invention, there is provided a method of inputting characters in a portable terminal, comprising the steps of: displaying a soft keyboard in a character input mode; selecting one or more characters by dragging on the soft key board; and inputting the one or more characters to a main screen area upon detecting the release of touch.

According to another aspect of the present invention, there is provided an apparatus for inputting characters in a portable terminal, comprising: a touch screen, having a soft keyboard displayed thereon, for generating a touch signal upon detecting a touch on the soft keyboard in a character input mode; and a controller for recognizing, when a key button of the soft keyboard is touched, a character corresponding to the touched key button, displaying the character enlarged, displaying one or more recommended words formed by combining characters which have been touched so far in a predetermined screen area, and inputting the character displayed enlarged to a main screen area upon detecting the release of touch.

According to another aspect of the present invention, there is provided an apparatus for inputting characters in a portable terminal, comprising: a touch screen, having a soft keyboard displayed thereon, for generating a touch signal upon detecting a touch on the soft keyboard in a character input mode; and a controller for inputting, when a key button of the soft keyboard is touched, a character corresponding to the touched key button to a main screen area, predicting a next input character on the basis of characters which have been touched so far, and displaying the predicted character.

According to another aspect of the present invention, there is provided an apparatus for inputting characters in a portable terminal, comprising: a touch screen, having a soft keyboard displayed thereon, for generating a touch signal upon detecting a touch on the soft keyboard in a character input mode; and a controller for selecting one or more characters by dragging on the soft keyboard and inputting the selected one or more characters to a main screen area detecting the release of touch.

BRIEF DESCRIPTION OF THE DRAWINGS

The above and other objects, features and advantages of the present invention will become more apparent from the following detailed description when taken in conjunction with the accompanying drawings in which:

FIGS. 10A, 10B, and 10C illustrate examples of a touch screen when the operation of FIG. 5 is performed according to an exemplary embodiment of the present invention.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

The present invention relates to a technique for inputting characters without errors using a touch screen in a portable terminal. This invention relates specifically to a method for inputting characters using a touch screen, wherein when the characters are input by touching a soft keyboard displayed on the touch screen, a touched character is displayed in a predetermined screen area, and when the release of touch is detected, the character displayed on the predetermined screen area is input to a main screen area. Herein, the predetermined screen area may be either an area included in the main screen area or an area near a key button touched by a user. The release of touch may be detected when a user's finger (or stylus pen) is released from the touch screen, or when a next-touch is detected, or when the touch is maintained over a predetermined length of time.

Figure 1:
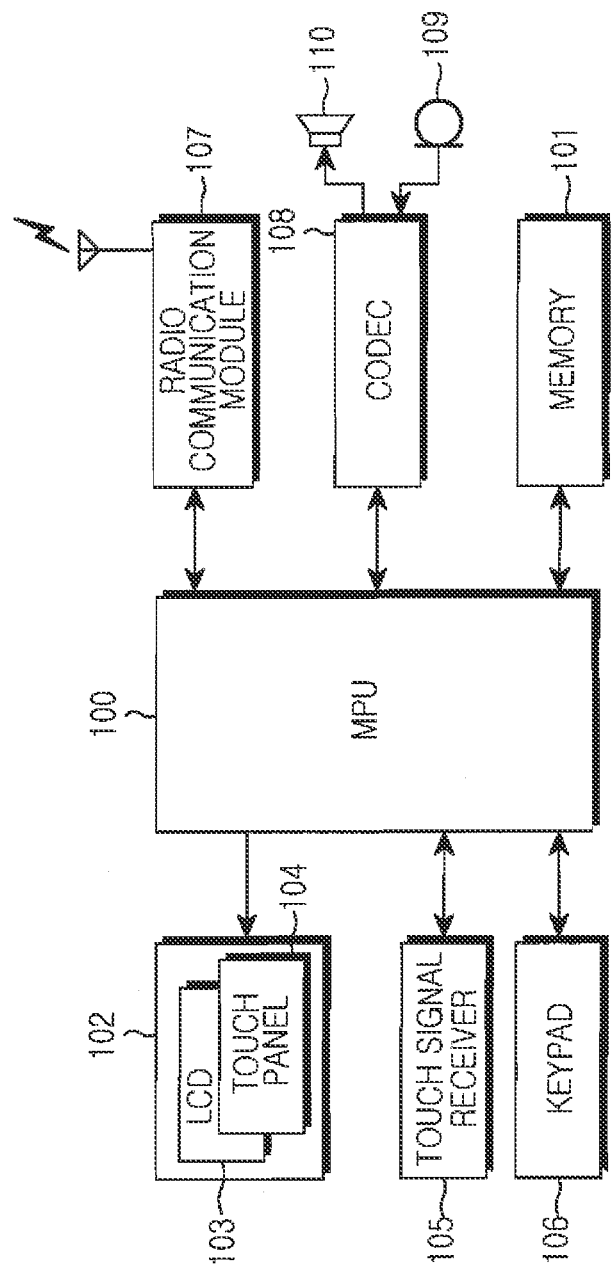
FIG. 1 is a block diagram of a portable terminal according to an exemplary embodiment of the present invention.

FIG. 1 is a block diagram of a portable terminal according to the present invention. "Portable terminal" as used herein refers to any pocket-sized portable terminal providing a PC (Personal Computer) function and a cell phone function.

Referring to FIG. 1, an MPU (Micro-Processor Unit) 100 provides overall control to the portable terminal. Specifically, the MPU 100 controls data processing and communication. According to the present invention, in addition to its typical functions, the MPU 100 controls error-free character input when characters are input by touching a keyboard displayed on a touch screen 102. The typical process and control of the MPU 100 are not described herein.

A memory 101 includes a program memory, a data memory, and a non-volatile memory. The program memory stores programs for controlling the entire operation of the portable terminal. It can be a flash memory. The data memory temporarily stores data generated during the operation of the portable terminal. A RAM (Random Access Memory) can be used as the data memory. The non-volatile memory stores phone numbers registered for short dialing and system parameters. The non-volatile memory may be an EEPROM (Electrically Erasable Programmable Read Only Memory).

The touch screen 102 includes an LCD (Liquid Crystal Display) 103 and a touch panel 104 mounted on the LCD 103. The touch screen 102 displays state information generated during the operation of the portable terminal, and can also display moving pictures and still images. The touch screen 102 outputs to a touch signal receiver 105 an electrical analog signal corresponding to a touch position. The touch signal receiver 105 analyses the electrical analog signal received from the touch screen 102 and outputs position data corresponding to the touch position to the MPU 100.

A keypad 106 has a plurality of alphanumeric keys and function buttons. The keypad 106 outputs button input data corresponding to a pressed button to the MPU 100.

A radio communication module 107 is a module for communicating with a BS (Base Station) according to a predetermined communication standard. It can include an RF (Radio Frequency) module and a BBA (BaseBand Analog).

A CODEC (Coder-Decoder) 108 connected to the MPU 100, and a speaker 110 and a microphone 109 connected to the CODEC 108 collectively form a voice input/output block for use in a phone call and voice recording. The CODEC 108 converts PCM (Pulse Code Modulation) data received from the MPU 100 to an analog voice signal and outputs it through the speaker 110. The CODEC 108 also converts a voice signal received through the microphone 109 to PCM data and provides the PCM data to the MPU 100.

Figure 2:
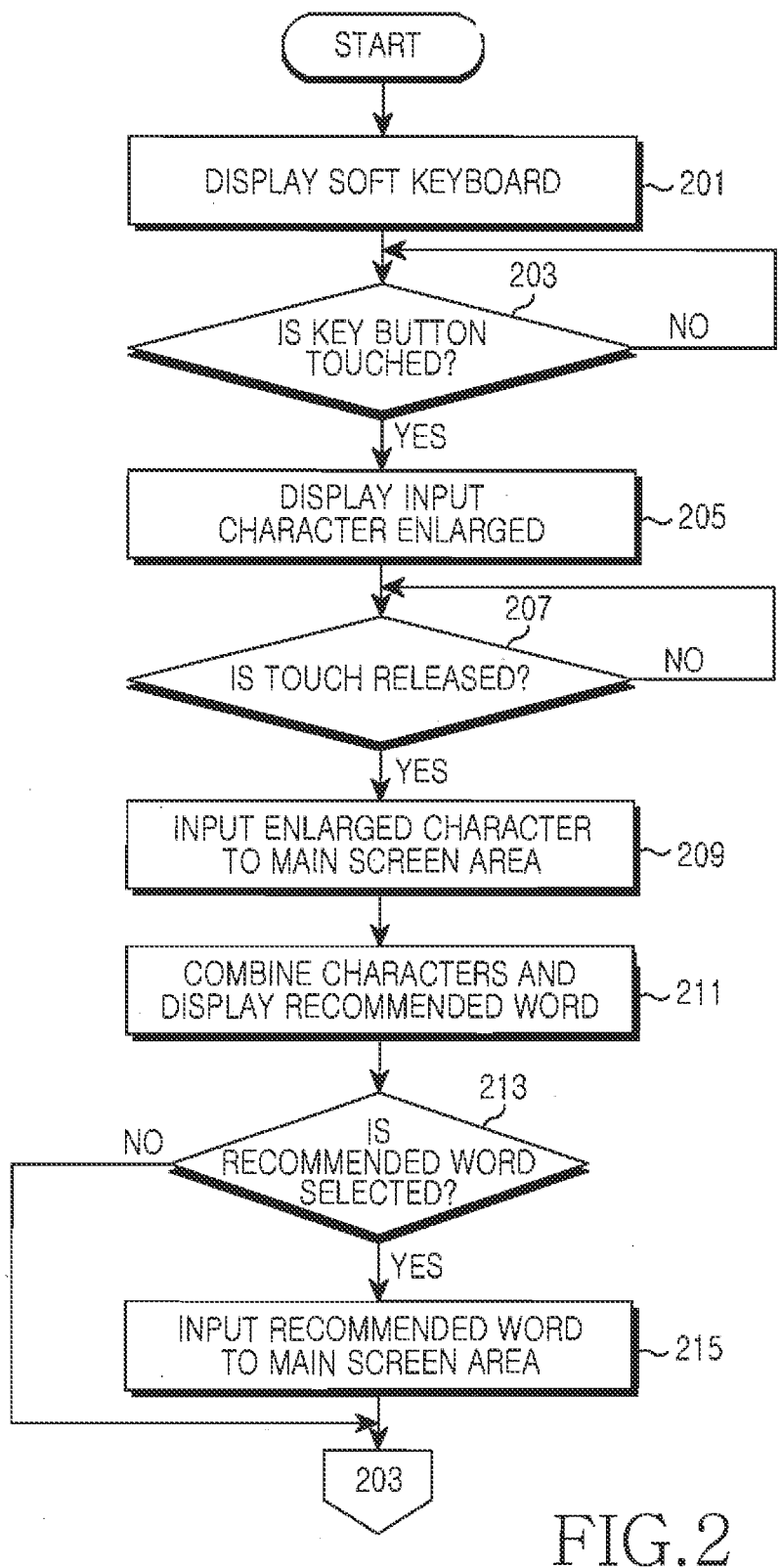
FIG. 2 is a flowchart illustrating an operation for inputting characters in a portable terminal according to an exemplary embodiment of the present invention.

FIG. 2 is a flowchart illustrating an operation for inputting characters in a portable terminal according to an embodiment of the present invention.

Referring to FIG. 2, when a character input mode is set, a soft keyboard (e.g., QWERTY keyboard) is displayed on a touch screen in step 201. The character input mode has to be set in order to input characters when using services such as SMS (Short Message Service), e-mail, Web browsing, messenger, and so on.

With the soft keyboard displayed, it is checked whether a key button is touched in step 203. Upon detecting the touch of the key button, a character corresponding to the touched key button is displayed enlarged in step 205. The character may be displayed enlarged near the touched key button as shown in diagram (a) of FIG. 7, or may be displayed enlarged in a predetermined portion of a main screen area.

Alternatively, the touched key button may be displayed with a specific color, so as to be easily noticed by the user. Further, the touch of the key button can be recognized by the user by using a specific effect such as a vibration effect or a sound effect. The character may be enlarged or displayed with a specific effect (e.g., color, vibration, sound, etc.) according to a user's preference.

In step 211, a word is predicted by combining characters which have been touched so far, and the predicted word is displayed in a predetermined portion of the main screen area as a recommended word. The characters may be combined using a well-known a T9 text input prediction and suggestion scheme. Referring to diagram (a) of FIG. 7, for example, when the user inputs characters "frie", a word "friend" is predicted and displayed in a predetermined portion of the main screen area. In this case, a plurality of recommended words may be displayed.

In step 207, it is checked whether the touch is released. As will be described with reference to FIG. 6, the release of touch is detected when a user's finger (or stylus pen) is released from the touch screen (step 601), or when a next touch is detected (step 603), or when the touch is maintained over a predetermined length of time (step 605).

Referring back to FIG. 2, upon detecting the release of touch, the character displayed enlarged is input to the main screen area in step 209. The character may be input to the main screen area with a specific graphic effect. For example, the character may be displayed as if it is drawn into or flown over the main screen area as shown in diagram (b) of FIG. 7. For another example, the character displayed near its corresponding key button may be displayed as if it is disappearing into the key button. Vibration or a specific sound may be produced to facilitate user recognition.

If the release of touch is not detected, it is checked whether the recommended word is selected in step 213. The recommended word is selected by pressing a predetermined key button. When a plurality of recommended words is provided, the recommended word can be selected by repeatedly pressing the predetermined key button until a desired word is selected.

If the recommended word is not selected, the procedure returns to step 203. Otherwise, in step 215, the selected recommended word is input to the main screen area, and the procedure returns to step 203. As shown in diagrams (a) and (b) of FIG. 7, a recommended word "friend" is displayed in a predetermined portion of the main screen area when the characters "frie" are input. As shown in diagram (c) of FIG. 7, when a predetermined key button (e.g., key button "●") is touched, the recommended word is input to the main screen area. In this case, vibration, sound, or graphic effect may be provided to facilitate user recognition.

Although not described in FIG. 2, a symbol mapped to its corresponding key button may be displayed enlarged when the user touches a key button (e.g., input mode shift key, caps lock key, etc.) to which no character is mapped. In this case, upon detecting the release of touch, the enlarged view of the symbol disappears and its corresponding function is performed.

Figure 3:
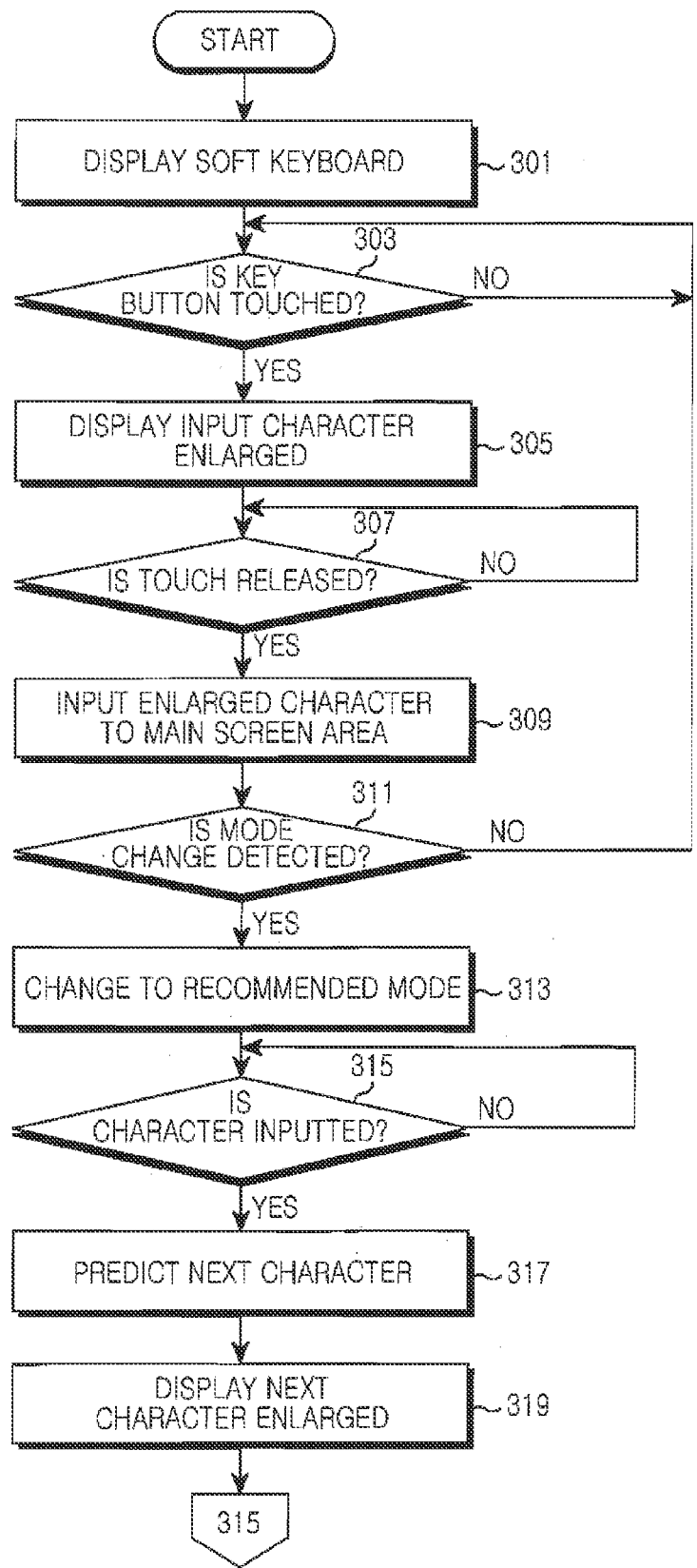
FIG. 3 is a flowchart illustrating an operation for inputting characters in a portable terminal according to another exemplary embodiment of the present invention.

FIG. 3 is a flowchart illustrating an operation for inputting characters in a portable terminal according to another embodiment of the present invention.

Referring to FIG. 3, when a character input mode is set, a soft keyboard (e.g., QWERTY keyboard) is displayed on a touch screen in step 301. The character input mode has to be set so as to input characters when using services such as SMS, e-mail, Web browsing, messenger, and so on.

With the soft keyboard displayed, it is checked whether a key button is touched in step 303. Upon detecting the touch of the key button, a character corresponding to the touched key button is displayed enlarged in step 305. The character may be displayed enlarged near the touched key button, or may be displayed enlarged in a predetermined portion of a main screen area. Alternatively, the touched key button may be displayed with a specific color, so as to be easily noticed by the user. Further, the touch of the key button can be recognized by the user by using a specific effect such as a vibration effect or a sound effect. The character may be enlarged or displayed with a specific effect (e.g., color, vibration, sound, etc.) according to a user's preference.

In step 307, it is checked whether the touch is released. The release of touch is detected when a user's finger (or stylus pen) is released from the screen, or when a next touch is detected, or when the touch is maintained over a predetermined length of time.

Upon detecting the release of touch, in step 309, the character displayed enlarged is input to the main screen area. In this case, vibration, sound, or graphic effect may be provided to facilitate user recognition.

In step 311, it is determined whether a mode change request is received to change the current mode to a recommended mode. The recommended mode is defined as a mode in which a next input character can be predicted on the basis of characters which have been input so far. The mode changing may be automatically performed when the number of input characters is enough to form a word or may be performed according to a user's selection.

If there is no mode change request, the procedure returns to step 303 so as to continue to detect the touch of key buttons. Otherwise, in step 313, the current mode changes to the recommended mode.

In step 315, it is checked whether there is a key button touch. Upon detecting the key button touch, a character corresponding to the touched key button is input to the main screen area. The character may be input to the main screen area immediately after a touch (or release of touch) is detected.

Figure 8A:
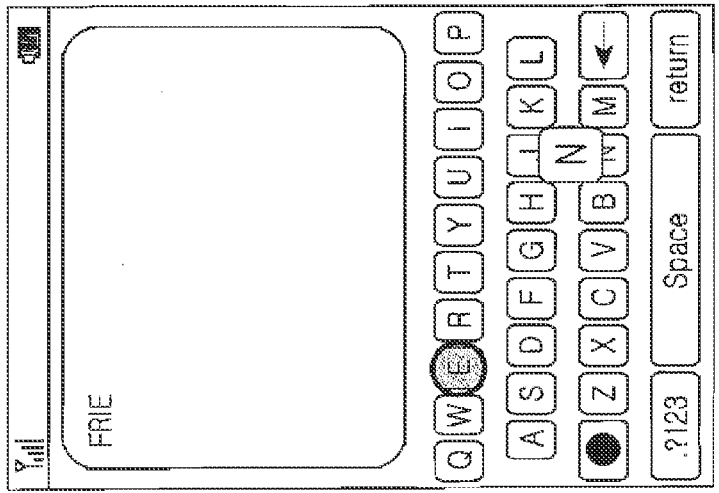
FIGS. 8A, 8B, and 8C illustrate examples of a touch screen when the operation of FIG. 3 is performed according to an exemplary embodiment of the present invention.
Figure 8B:
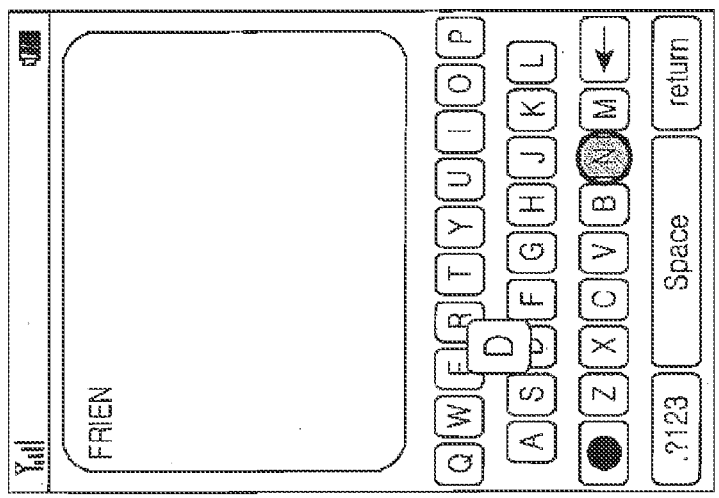
Figure 8C:
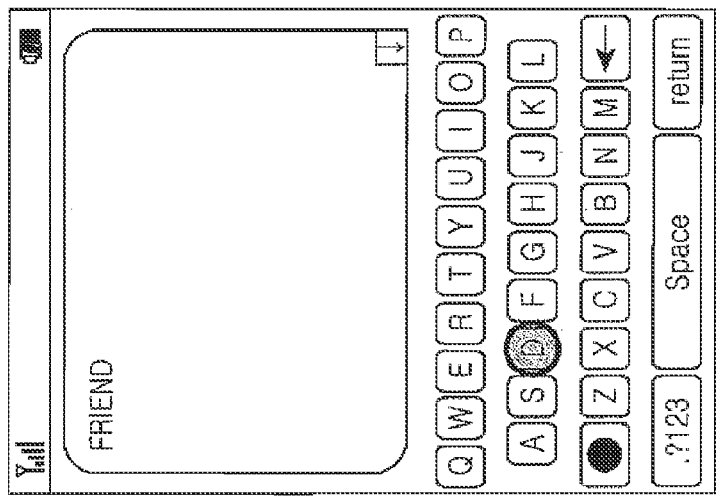
Figure 9A:
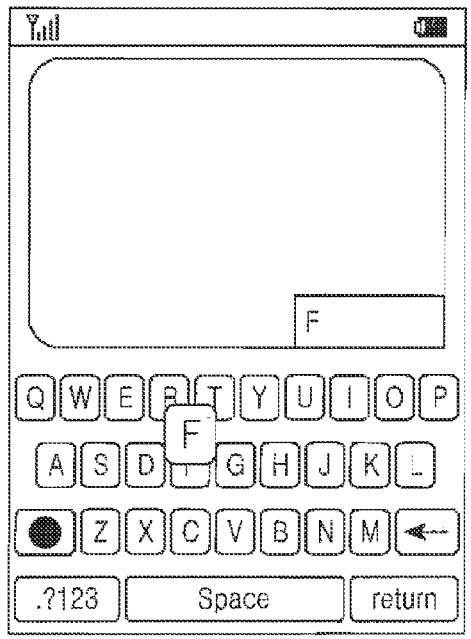
FIGS. 9A, 9B, 9C, and 9D illustrate examples of a touch screen when the operation of FIG. 4 is performed according to an exemplary embodiment of the present invention.
Figure 9B:
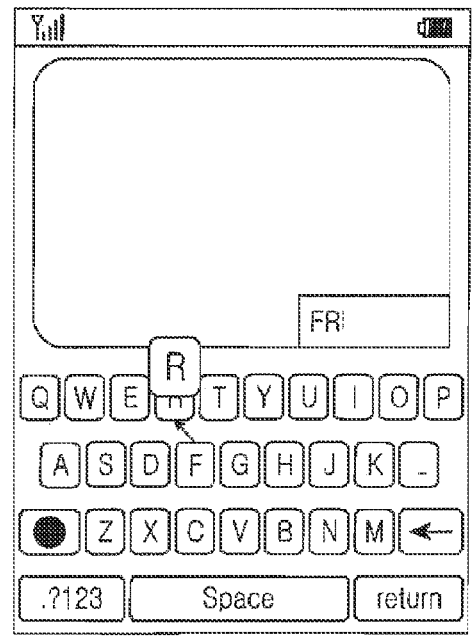
Figure 9C:
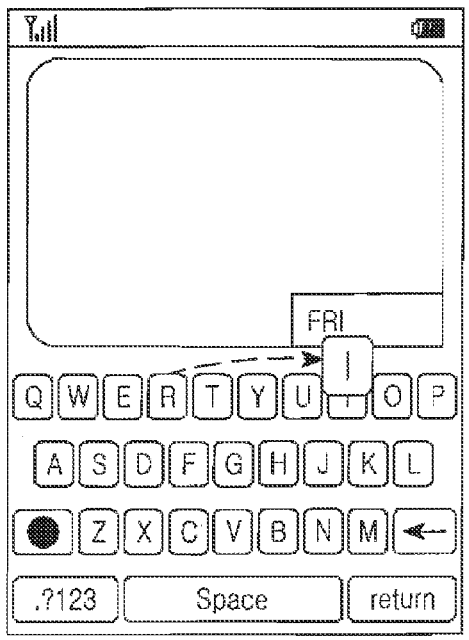
Figure 9D:
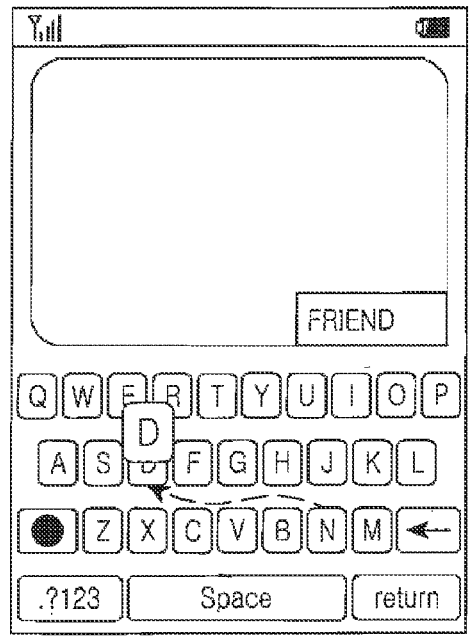

In step 319, the characters which have been input so far are combined to predict a next input character. In step 321, the predicted character is displayed enlarged, and the procedure returns to step 315. The predicted character may be displayed enlarged near its corresponding key button or may be displayed enlarged in a predetermined portion of the main screen area. For example, as shown in FIG. 8, when the user intends to input "friend", "n" is displayed enlarged immediately after a key button "e" is touched, and "d" is displayed enlarged immediately after a key button "n" is touched.

Figure 4:
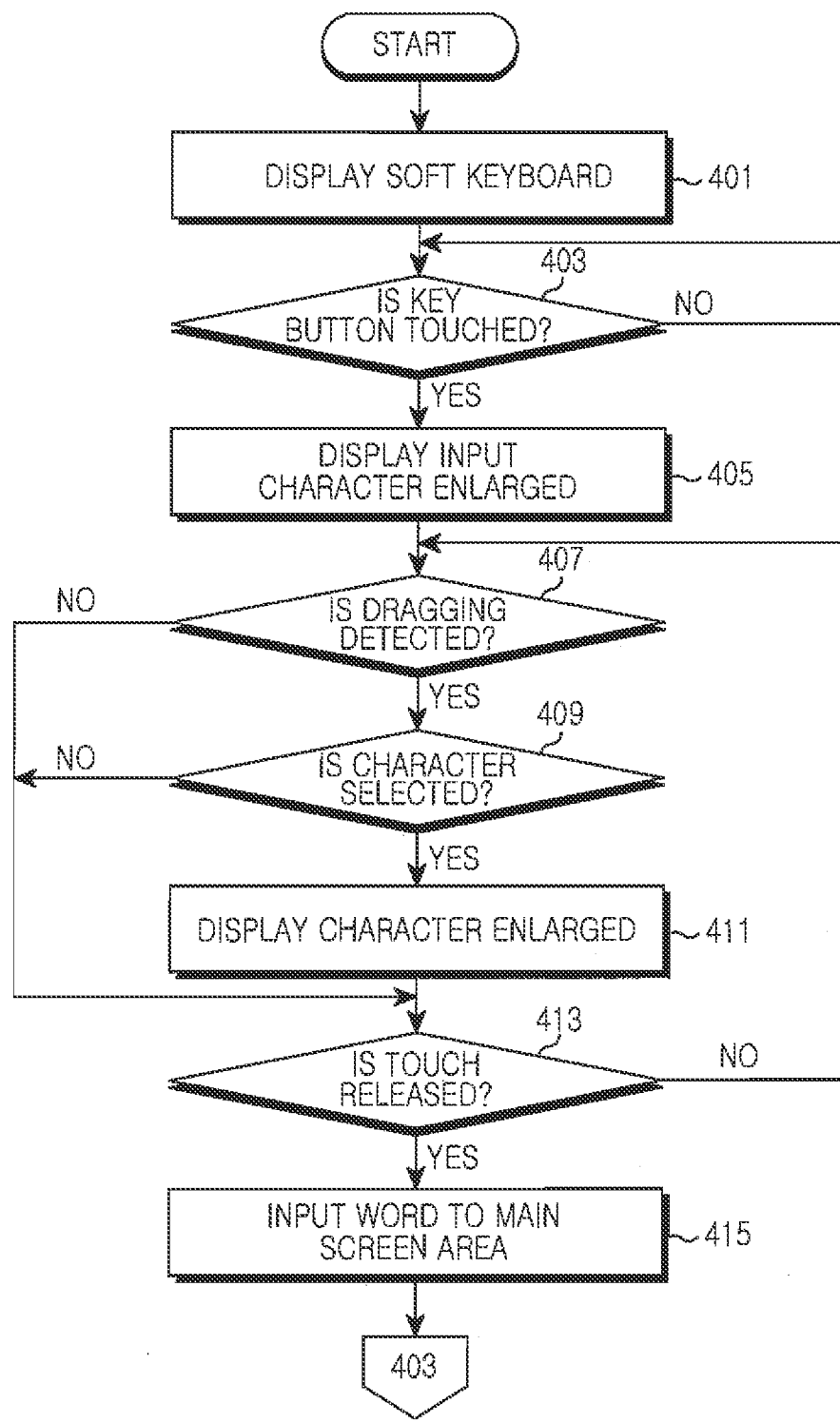
FIG. 4 is a flowchart illustrating an operation for inputting characters in a portable terminal according to another exemplary embodiment of the present invention.

FIG. 4 is a flowchart illustrating an operation for inputting characters in a portable terminal according to still another embodiment of the present invention.

Referring to FIG. 4, when a character input mode is set, a soft keyboard (e.g., QWERTY keyboard) is displayed on a touch screen in step 401. The character input mode has to be set so as to input characters when using services such as SMS, e-mail, Web browsing, messenger, and so on.

With the soft keyboard displayed, it is checked whether a key button is touched in step 403. Upon detecting the touch of the key button, a character corresponding to the touched key button is displayed enlarged in step 405. The character may be displayed enlarged near the touched key button, or may be displayed enlarged in a predetermined portion of a main screen area. Alternatively, the touched key button may be displayed with a specific color, so as to be easily noticed by the user. Further, the touch of the key button can be recognized by the user by using a specific effect such as a vibration effect or a sound effect. The character may be enlarged or displayed with a specific effect (e.g., color, vibration, sound, etc.) according to a user's preference.

In step 407, it is checked whether a touch point is moved. The touch point is moved when the user moves his/her finger without releasing the touch (hereinafter, referred to as "dragging"). If no dragging is detected, it is checked whether the touch is released in step 413. Otherwise, it is checked whether a character is selected in step 409. The selection of the character may be detected when the user's finger stays at a key button mapped to the character for a predetermined length of time or when the key button is slightly pressed.

If the selection of the character is not detected, it is checked whether the touch is released in step 413. Otherwise, the selected character is displayed enlarged in step 411. For example, as shown in diagram (a) of FIG. 9, when the user first touches the key button "f", the character "f" is displayed enlarged. In this state, when the user's finger is dragged to select the key button "r", the character "r" is displayed enlarged. The process of selecting characters may be displayed to facilitate user recognition by using a graphic effect (e.g., dotted arrow shown in FIG. 9). Alternatively, vibration or specific sound may be generated upon selecting a character.

In the process of selecting characters by dragging, it is checked whether the touch is released in step 413. The release of touch may be detected when a key button is released so as to input characters, which have been selected so far by dragging, to the main screen area. Also, the release of touch may be detected when a predetermined key button is released so as to input a word, which is formed by combining input characters, to the main screen area.

If the release of touch is not detected, the procedure returns to step 407 for detecting dragging. Upon detecting the release of touch, in step 415, the characters selected by dragging is input to the main screen area, and the procedure returns to step 403. In the case where a character combination function is provided, a complete word may be displayed in the main screen area even if the touch is released before character input is not finished.

Figure 5:
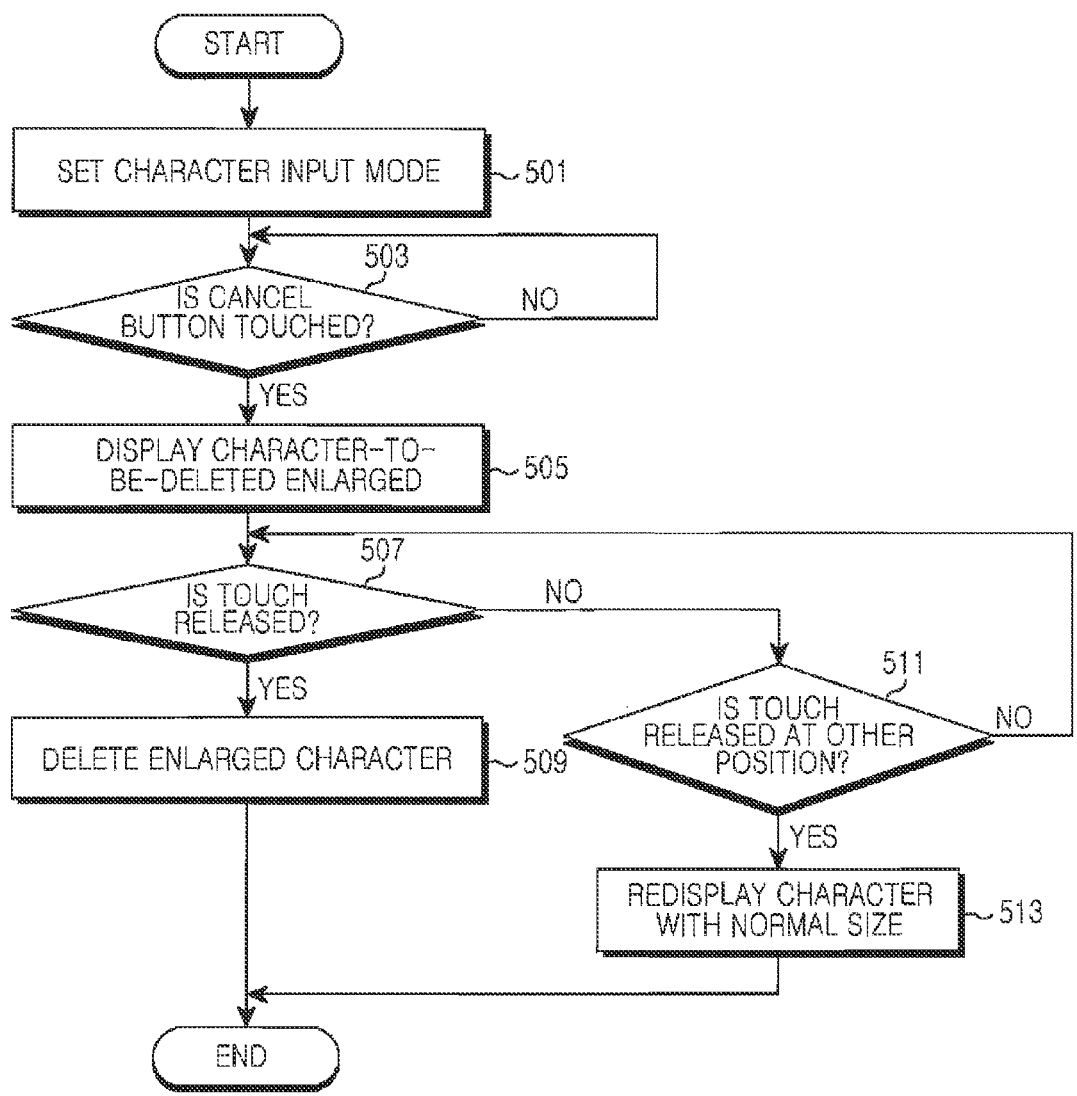
FIG. 5 is a flowchart illustrating an operation for canceling input of characters in a portable terminal according to an exemplary embodiment of the present invention.

FIG. 5 is a flowchart illustrating an operation for deleting an input of characters in a portable terminal according to the present invention.

Referring to FIG. 5, when a character input mode is set, characters are input by touching key buttons in step 501. While inputting the characters, in step 503, it is checked whether a cancel key button for deleting an input of characters is touched. The cancel key button may be a backspace key or a delete key.

Upon detecting the touch of the cancel key button, in step 505, a character-to-be-deleted is displayed enlarged. The character-to-be-deleted may be a last input character or a character located near a cursor. The character-to-be-deleted may be displayed enlarged near its corresponding key button or may be displayed in the main screen area. For example, as shown in diagram (a) of FIG. 10, when the backspace key button is touched, the last input character "s" is displayed enlarged as shown in diagram (b) of FIG. 10.

In step 507, it is checked whether the backspace key button is released. Upon detecting the release of the backspace key button, in step 509, the character "s" displayed enlarged is deleted, and then the procedure is ended. Consequently, as shown in diagram (c) of FIG. 10, the enlarged character "s" is deleted.

If the release of the backspace key button is not detected, in step 511, it is checked whether the user's finger (or stylus pen) is dragged and released at a predetermined position (or key button). If no dragging is detected, the procedure returns to step 507. Otherwise, in step 513, the enlarged character is re-displayed with a normal size, and then the procedure is ended. That is, when the user does not intent to delete the character, the user may drag his/her finger to the predetermined position and then releases it from that position.

As described above, the release of touch may be detected in a various manners when the character input mode is set.

Figure 6:
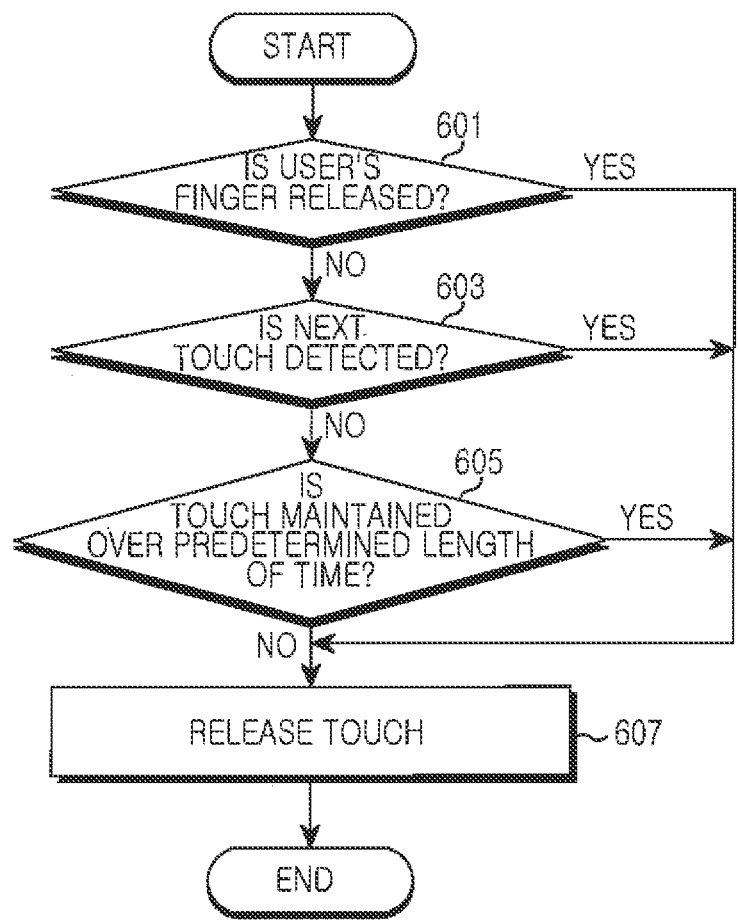
FIG. 6 is a flowchart illustrating an operation for detecting the release of touch in a portable terminal according to an exemplary embodiment of the present invention.

FIG. 6 is a flowchart further illustrating the step 209 of FIG. 2 and the step 307 of FIG. 3.

Referring to FIG. 6, it is checked whether a user's finger is released from a touch screen. If the finger is released from the touch screen, a current touch is released in step 607. Otherwise, in step 603, it is checked whether there is a next touch (or another touch). Upon detecting the next touch, in step 607, the next touch is released. If the next touch is not detected, in step 605, it is checked whether the touch is maintained over a predetermined length of time. If the touch is maintained over the predetermined length of time, the touch is released in step 607.

Figure 7A:
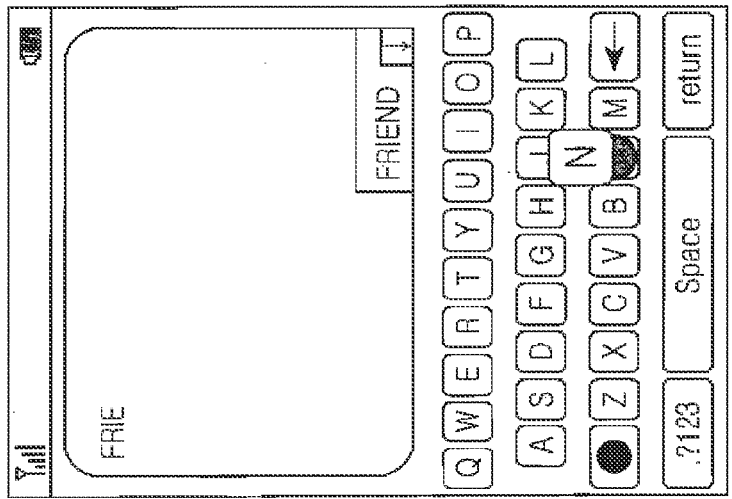
FIGS. 7A, 7B, and 7C illustrate examples of a touch screen when the operation of FIG. 2 is performed according to an exemplary embodiment of the present invention.
Figure 7B:
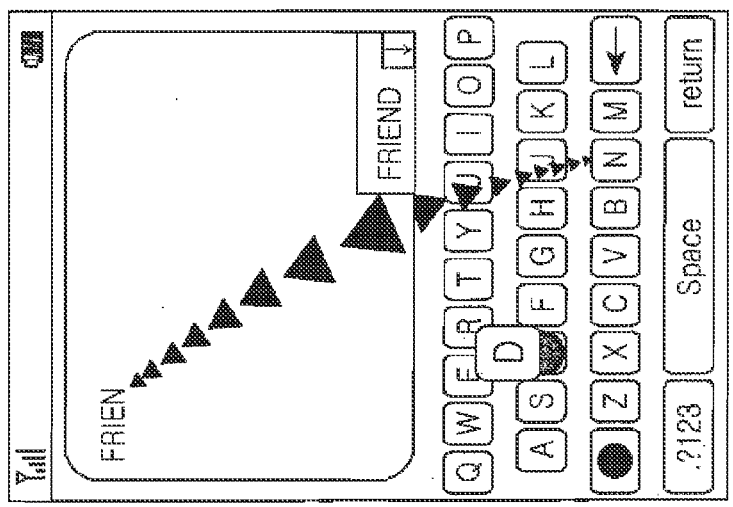
Figure 7C:
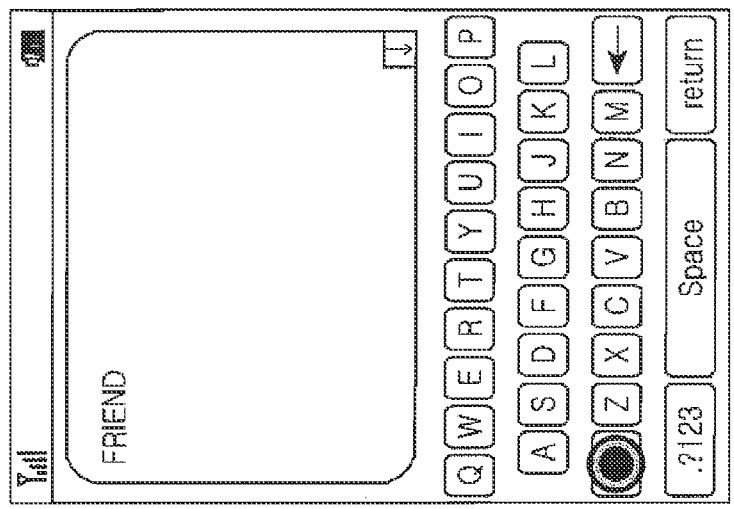

FIG. 7 illustrates examples of a touch screen when the operation of FIG. 2 is performed.

Diagram (a) of FIG. 7 illustrates a touch screen where a key button "n" is touched in a state that characters "frie" have already been input when a user intends to input "friend". As a result, a character "n" is displayed enlarged near the key button "n", and a recommended word "friend" is predicted on the basis of the characters "frie" which have been touched so far. The recommended word is displayed in a predetermined portion of a main screen area. In this state, when the user releases the touch of the key button "n" and then touches a key button "d", as shown in diagram (b) of FIG. 7, the character "n" is input to the main screen area, and the touched character "d" is displayed enlarged near the key button "d". Still, the recommended word "friend" is displayed in the predetermined portion of the main screen area. In this state, if the user touches a predetermined key button (e.g., key button "●"), the recommended word is input to the main screen area as shown in diagram (c) of FIG. 7.

FIG. 8 illustrates examples of a touch screen when the operation of FIG. 3 is performed.

Diagram (a) of FIG. 8 illustrates a touch screen where a key button "e" is touched when a user intends to input "friend". In this case, a next input character "n" is predicted on the basis of characters "frie" which have been input so far, and the predicted character "n" is displayed enlarged near its corresponding key button "n". When the user touches the key button "n", as shown in diagram (b) of FIG. 8, the character "n" is input to the main screen area. Then, a character "d" is predicted and displayed near its corresponding key button "d".

FIG. 9 illustrates examples of a touch screen when the operation of FIG. 4 is performed.

Diagram (a) of FIG. 9 illustrates a touch screen where a key button "f" is touched when a user intends to input "friend". Then, a character "f" is displayed enlarged near the key button "f". In this state, when the user selects a key button "r" by dragging, as shown in diagram (b) of FIG. 9, a character "r" is displayed enlarged near the key button "r". Subsequently, when the user selects a key button "i" by dragging, a character "i" is displayed enlarged near the key button "i". Characters "fri" which have been selected so far are displayed in a predetermined portion of the main screen area. When characters forming a desired word are all selected by dragging, the user releases the touch so as to input the word to the main screen area.

FIG. 10 illustrates examples of a touch screen when the operation of FIG. 5 is performed.

When a backspace key button is touched in a state that "fries" are input as shown in diagram (a) of FIG. 10, a last input character "s" is displayed enlarged as shown in diagram (b) of FIG. 10. The character "s" is deleted from the main screen area as shown in diagram (c) of FIG. 10 when the user releases the touch of the backspace key button.

In accordance with the present invention as described above, when a character is input using a soft keyboard displayed in a touch screen, a touched character is displayed enlarged in a predetermined screen area and input in a main screen area upon detecting the release of touch. Therefore, a user can confirm the touched character before it is input. In addition, the touched character can be input with user's approval (release of touch), thereby remarkably reducing input errors.

While the invention has been shown and described with reference to a certain preferred embodiment thereof, it is a mere exemplary application. Thus, it will be understood by those skilled in the art that various changes in form and details may be made therein without departing from the spirit and scope of the invention as defined by the appended claims.

What is claimed is:

1. A method of inputting characters in a portable terminal, comprising the steps of:
    displaying a plurality of characters on a keyboard;
    detecting a touch on the keyboard;
    displaying a first character corresponding to a key corresponding to the touch on the keyboard as enlarged relative to other characters upon detecting the touch;
    displaying a second character corresponding to a key corresponding to a touch-move on the keyboard as enlarged relative to other characters on the keyboard upon detecting the touch-move without a release of the touch;
    displaying the second character, which is displayed enlarged when detecting the release of the touch, in a character input area upon detecting the release of the touch on the keyboard; and
    in response to displaying the second character, displaying a plurality of recommended words in a vicinity of the keyboard in the character input area,
    wherein the recommended words are determined based on the second character and other characters which have been displayed in the character input area.

2. The method of claim 1, wherein the keyboard is a QWERTY keyboard.

3. The method of claim 1, wherein the release of the touch is detected when an object is released from the keyboard, or when a next touch is detected, or when the touch is maintained over a predetermined length of time.

4. The method of claim 1, wherein the second character is displayed as enlarged near its corresponding key or in a predetermined portion of the character input area.

5. The method of claim 1, further comprising:
    selecting one of the recommended words; and
    displaying the selected recommended word in the character input area.

6. The method of claim 1, further comprising, when the character is displayed in the character input area, generating at least one of a vibration, sound, and a graphic effect.

7. The method of claim 1, wherein the portable terminal is a pocket-sized communication terminal.

8. A computer-readable medium comprising instructions that, when executed by at least one processor of a portable terminal, cause the portable terminal to execute the method of claim 1.

9. The method of claim 1, further comprising, upon detecting a touch input on the displayed recommended word, displaying, in the character input area, the recommended word in lieu of the other characters and the second character which have been displayed.

10. The method of claim 1, further comprising displaying a predicted character of the keyboard as enlarged, wherein the predicted character is determined as a character which has not been displayed among characters of the recommended word.

* * * * *